Patented Dec. 29, 1942

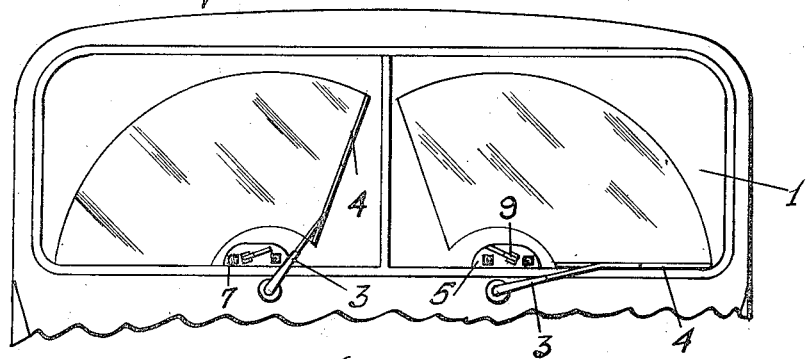
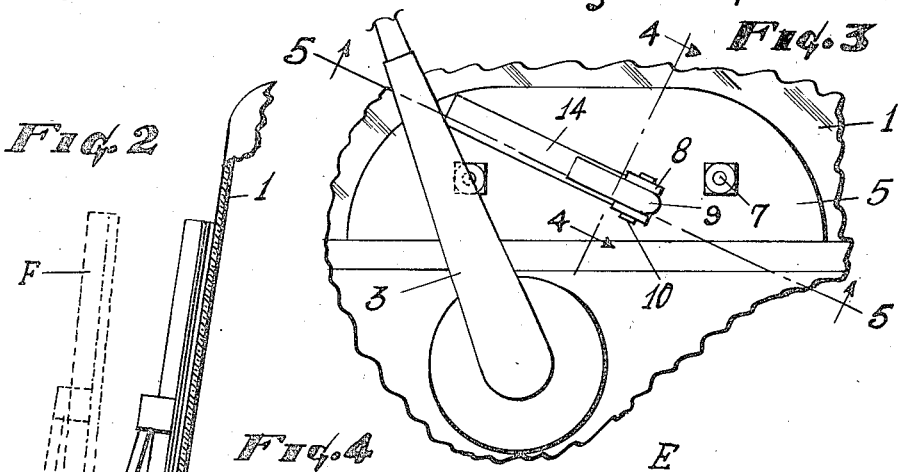
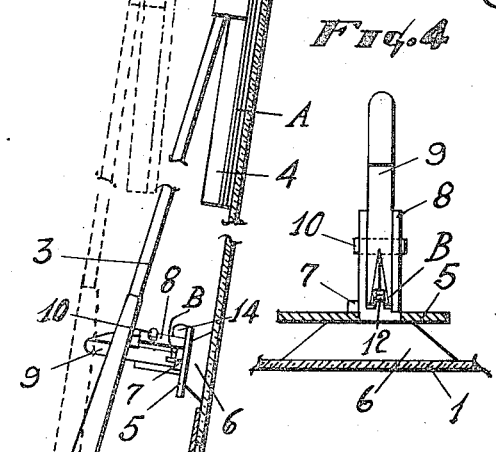
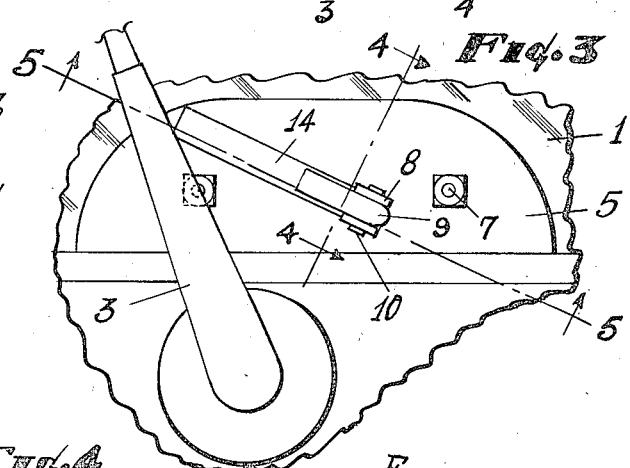
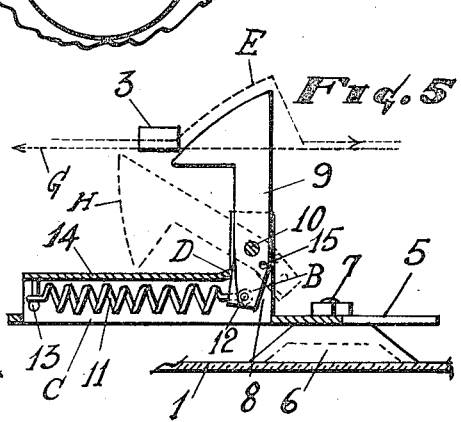
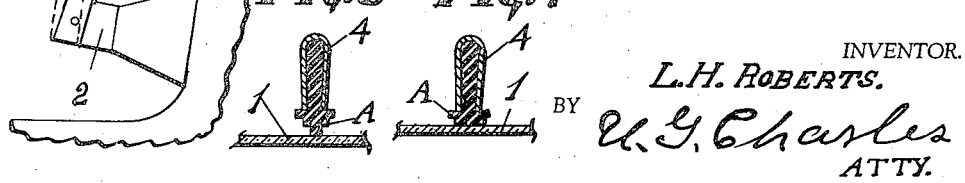

2,306,980

UNITED STATES PATENT OFFICE 2,306,980

WINDSHIELD WIPER BLADE CLEANING DEVICE

Leslie H. Roberts, McPherson, Kans.

Application December 1, 1941, Serial No. 421,144

4 Claims. (Cl. 15—255)

This invention relates to a windshield wiper blade cleaning device, and the principal object thereof is to provide a device to work in conjunction with a windshield wiper mechanism to cause the rubber element of the wiper blade to be compressed for the purpose of preventing ice or snow accumulation on said blade during weather hazards.

A still further object of this invention is to provide a simple device that will raise and drop the wiper arm, thereby causing the wiper blade to strike the windshield with sufficient force to jar and compress the rubber element, whereby ice or snow accumulation will be knocked therefrom.

A still further object of this invention is to provide a simple means for attaching the device in the wiper arm's arc path of travel so that the wiper arm may be momentarily interrupted in its normal rocking movement.

These and other objects will hereinafter be more fully explained, reference being had to the accompanying drawing, forming a part of this specification, and in which like characters will apply to like parts in the different views.

Referring to the drawing:

Fig. 1 is a front elevation of a windshield, showing a pair of blade cleaning devices mounted thereon.

Fig. 2 is a side view of a windshield wiper showing the position of the cleaning device, parts removed for convenience of illustration.

Fig. 3 is an enlarged front elevation of the device as mounted on the windshield which is fragmentarily shown.

Fig. 4 is a sectional view taken on line 4—4 in Fig. 3.

Fig. 5 is a sectional view taken on line 5—5 in Fig. 3, and showing the wiper arm's line of motion by dotted lines.

Fig. 6 is a cross section of a blade in its normal operating position on the windshield.

Fig. 7 is a similar view to that of Fig. 6, but showing a possible compression of the rubber element of the blade as a result of this invention.

This invention herein disclosed relates to windshield wiper blade cleaning device for the purpose of preventing ice or snow accumulation on the wiper blade so that the same may be effective in its function in snowy or cold rainy weather conditions. During bad weather conditions, the tendency is for ice or packed snow to adhere to the blade, thereby hampering its function to clear the windshield.

The object of this invention is to jar the blade and at the same time compress or change the form of its rubber element momentarily, whereby the ice accumulation will be prevented.

To accomplish the above result, I have provided a device that may be mounted on the windshield 1 adjacent the usual windshield wiper oscillating shaft 2, the motor for said shaft not being shown in the drawing. Said device being so positioned, will contact the wiper arm 3 momentarily in the arm's rocking motion, said wiper arm having the usual blade 4 attached on its free end and a rubber element extending outward from the blade as at A to contact the surface of the windshield.

The component parts of this invention consist of a supporting base plate 5 mounted on the lower portion of the windshield through the medium of a pair of suction cups 6 appropriately secured to the plate 5 by bolts 7. Radially extending from the side of the plate 5 and secured thereto is a pair of ears 8, said ears being spaced apart and between which is positioned an arm member 9, said member being rockably arranged by a pin 10 that is rigidly secured in the ears but loosely passing through said arm member.

It will be seen in Fig. 3 that the arm member is positioned on the plate to contact the wiper arm 3 when said wiper arm is past a vertical position to avoid an interference of wiper blade in the center of the windshield; and furthermore it will be seen that the arm member 9 is slantingly positioned so that its direction of movement is substantially in an arc line of travel with respect to the turning axis of the oscillating shaft 2 to permit easy rocking movement of the said member when contacted by the wiper arm 3. Extending upward and in alignment with the arm's line of rocking movement is a coil spring 11, one end of the spring being secured to the inner free end of the arm member through the medium of a pin 12 engaging through legs B at the inner free end of the said arm member, the other end of the spring being retained by a pin 13 that is joined to the inner side wall of an arcuate cover 14, said cover to function as an enclosure for the spring and opening C in the plate 5, said opening being provided for free movement of the spring, and for assembly thereof.

The arm member 9 is normally positioned perpendicular to its supporting plate, and when contacted in one direction of the swinging wiper arm, is restricted against rocking movement by an engagement of its inner free end with a shoulder D formed by the inner end of the arcuate cover 14. The side of the outer free end of the arm contacted by the wiper arm in said direction is enlarged, made arcuate, and slanting upward so that the wiper arm in its movement as shown by a dotted line E in Fig. 5 will slide freely thereover, and in this action the wiper arm 3 has moved away from the windshield, carrying the blade therewith, as shown by a dotted line F in Fig. 2. When the wiper arm 3 leaves the peak of the arcuate end of the arm member, it will be suddenly forced toward the windshield, causing the blade to strike the windshield, at which moment the rubber element will be jarred and compressed as shown in Fig. 7 to force ice or snow accumulation therefrom.

It will be understood that the wiper arm 3 is hingedly connected to the oscillating shaft 2 and spring tensioned to maintain the rubber element against the windshield, but may be moved away from the windshield if force is applied to the wiper arm. In the opposite direction of the wiper arm previously described, the blade will continuously contact the windshield and move as shown by dotted lines G in Fig. 5, due to the reason that said arm member 9 is adaptable of being rocked downward to permit the wiper arm 3 to slide thereover, at which time the arm member 9 will take the position as shown by dotted lines 4 in Fig. 5. As soon as the wiper arm leaves the arm member 9, said member will be instantly rocked back by the spring 11 for another lift of the wiper arm when contacted. In Figs. 1 and 3 the arm member 9 is arranged to rock upward so that the blade will make a jump in its downward rocking movement as it climbs over the arcuate end of the arm member and falls off.

The inner contact side of the free end of the arm member is provided with a V-shaped edge so that should snow or ice deposit between the edge and its stop, the V-shaped form will force the deposit to the sides; however, it may be preferred to enclose the device, except the arcuate end of the arm member by any suitable flexible covering to prevent snow or ice deposits interfering with the performance of the device.

In warm weather, the arm member 9 may be disengaged from contacting the wiper arm by pressing the outer end of the arm member toward plate 5 and inserting a pin through aperture 15, the ends of which will strike the ears to retain said arm member in such position until freezing weather approaches.

Having fully described my invention what I claim as new and desire to secure by Letters Patent is:

1. In a windshield wiper blade cleaning device comprising a base plate, means to secure the same in close relation to a rockable windshield wiper arm, a member hingedly connected to the plate and extending into the rocking path of the wiper arm, means on the plate to retain the member from rocking when contacted by the arm in one direction of movement, the side of the member contacted by the arm in said direction sloping in a direction upward to permit the arm to slide thereover as raising means for the arm, means on the plate to permit the member to rock out of the path of the wiper arm when the arm rocks in the opposite direction, and spring means to return the member into the rocking path of the wiper arm when the arm has left the member.

2. In a windshield wiper blade cleaning device comprising a rockable arm member and means to hingedly connect the same to a vehicle body adjacent its windshield wiper mechanism, and in the rocking path of the windshield wiper arm, means to restrict the movement of the arm member when contacted by the arm in one direction of movement, the side of the member contacted in said direction being slantingly positioned upward to permit the wiper arm to slide thereover and simultaneously raise the wiper arm for a rebound of the wiper arm's blade to the windshield, means to permit rocking of the member when contacted by the arm in its opposite rocking movement for a continuous engagement of the blade on the windshield, and spring means to retract the member when disengaged by the arm in last said direction of movement.

3. In a device of the class described comprising a plate, means to secure the same to a windshield in parallelism therewith and in close proximity to the path of a windshield swinging wiper arm, a pair of ears, spaced apart, secured to a side of the plate and radially extending therefrom, an arm member perpendicular to said plate, extending into the path of the swinging arm and positioned between said ears, a pin to hingedly connect the arm member to the ears intermediate of the length of the arm member, spring means secured to said inner end of the arm member to retain said arm member as perpendicularly positioned, stop means to restrict the movement of the member when engaged by the swinging arm in one of its directions of movement, the side of the member contacted by said swinging arm in said direction sloping in one direction upward to permit movement of the arm thereover, said member adapted to be rocked when engaged by the swinging arm in its opposite direction of movement to momentarily clear the rocking path of the swinging arm.

4. In a device of the class described to raise and drop the swinging arm of a windshield wiper for a rebound of the wiper arm's blade against the windshield for compressing the blade, said device comprising a rockable member and means to hingedly connect the same adjacent the wiper arm so that a portion thereof extends into the rocking path of the wiper arm, means on the member as engaged by the arm in one of its directions of movement to raise the arm and allow passage of the arm thereover, first said means to permit rocking of the member when contacted by the arm in its opposite direction of movement to maintain a continuous engagement of the blade with the windshield.

LESLIE H. ROBERTS.